(No Model.)
G. DORNAS.
STAMP FOR CUTTING OUT BLANKS.
No. 580,662. Patented Apr. 13, 1897.
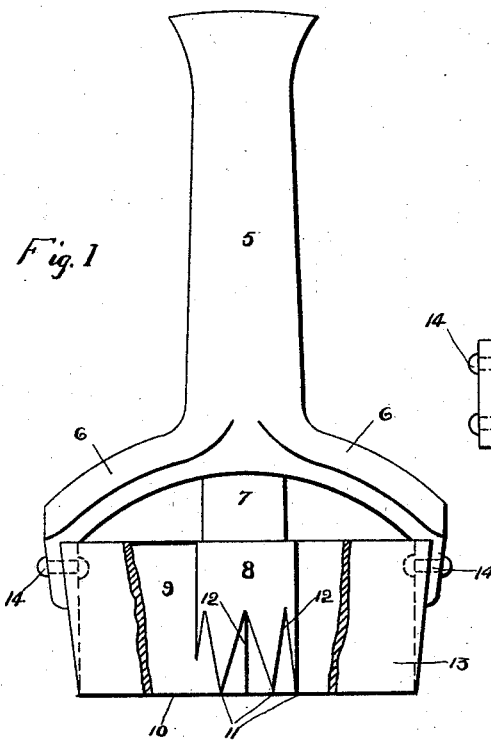
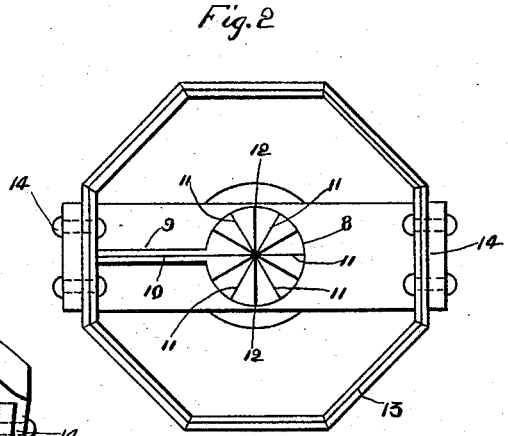
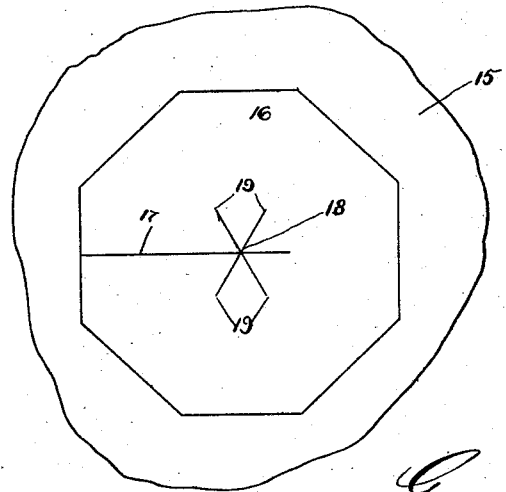
WITNESSES
J. A. Brophy
C. Gersh
INVENTOR
George Dornas.
BY
Edgar Tate & Co
ATTORNEYS.

UNITED STATES PATENT OFFICE.

GEORGE DORNAS, OF WINFIELD, NEW YORK.

STAMP FOR CUTTING OUT BLANKS.

SPECIFICATION forming part of Letters Patent No. 580,662, dated April 13, 1897.

Application filed January 19, 1897. Serial No. 619,733. (No model.)

*To all whom it may concern:*

Be it known that I, GEORGE DORNAS, a citizen of the United States, residing at Winfield, in the county of Queens and State of New York, have invented certain new and useful Improvements in Stamps for Cutting Out Various Forms of Blanks, of which the following is a full and complete specification, such as will enable those skilled in the art to which it appertains to make and use the same.

This invention relates to stamps for cutting out various forms of blanks, and particularly for cutting out blanks desired for use as shields for protecting small plants or trees, so as to prevent insects from climbing the same.

The invention is fully disclosed in the following specification, of which the accompanying drawings form a part, in which—

Figure 1 is a side view of my improved stamp, part thereof being broken away to better show the construction; Fig. 2, a bottom plan view thereof; and Fig. 3, a view of a sheet of material from which the blank is cut, showing the method of the operation of the device.

In the drawings forming part of this specification the separate parts of my improvement are designated by the same numerals of reference in each of the views, and in the practice of my invention I provide a stamp which consists of a shaft or handle 5, which is provided with outwardly and downwardly curved arms 6 and centrally of which is formed a depending shank 7, the lower end of which is provided with a cylindrical head 8, on one side of which is formed a radial blade 9, which is provided with a cutting lower edge 10, and the head 8 is provided with six radial cutting edges 11, including the cutting edge 10 of the blade 9, which extend inwardly to the center of the bottom of the head 8. These radial cutting edges 11 are produced by forming triangular vertical notches or grooves 12 in the lower end of the cylindrical head 8, and secured to the arm 6 of the shaft or handle 11 is a rim 13, which is preferably octagonal in form, said rim being bolted to said arms, as shown at 14, and the rim 13 is also provided with a cutting edge at the bottom thereof, and in Fig. 3 I have shown a sheet 15 of material from which the blanks may be cut, and at 16 one of said blanks.

The blank 16 when cut from the sheet 15 will be provided with a radial slot 17, which extends to the center thereof, as shown at 8, and extending radially from said center 18 are slots 19, which are formed by the cutting edges 11, hereinbefore described.

The blanks 16 are usually cut from tarred paper or similar material, and said blanks are adapted to be connected with a small shrub, plant, or tree by opening the slit 7, so that the body of the plant, shrub, or tree may be passed therethrough into the center of the blank, and then depressing the perimeter or edges of the blank, in which position the triangular points at the center thereof will project upwardly and the edge of the perimeter will project downwardly around the body of the shrub, tree, or plant, thus forming a conical shield or guard which is intended to prevent bugs, worms, or other insects from climbing the shrub, tree, or plant, and thus to form a protection therefor, it being understood that the material of which the shield or guard is composed also aids in producing this result.

It will be apparent that changes in and modifications of the construction herein described may be made without departing from the spirit of my invention or sacrificing its advantages.

Having fully described my invention, I claim as new and desire to secure by Letters Patent—

1. The herein-described stamp for cutting out blanks, the same consisting of a shaft or handle provided at its lower end with radial outwardly and downwardly curved arms to which is secured a cutting-rim, the lower edge of which is sharpened, and said shaft or handle being also provided with a depending cylindrical head which is provided with radial cutting edges at its lower end, and at one side with a radial arm which extends outwardly to the rim, and the lower edge of which is sharpened, substantially as shown and described.

2. The herein-described stamp, the same consisting of a shaft or handle as 5, radial arms as 6, a connecting-rim 13, a depending central head as 8, provided with radial cutting edges as 11, and a radial arm as 9, the lower edge of which is sharpened, substantially as shown and described.

In testimony that I claim the foregoing as my invention I have signed my name, in presence of the subscribing witnesses, this 16th day of January, 1897.

GEORGE DORNAS.

Witnesses:
 ANDREW BÄCKER,
 EDWD. H. WEBER.